Sept. 21, 1948.    J. F. SEBALD    2,449,790
SEPARATOR

Filed March 17, 1945    2 Sheets-Sheet 1

Joseph F. Sebald
INVENTOR

BY
ATTORNEY

Sept. 21, 1948.   J. F. SEBALD   2,449,790
SEPARATOR
Filed March 17, 1945   2 Sheets-Sheet 2
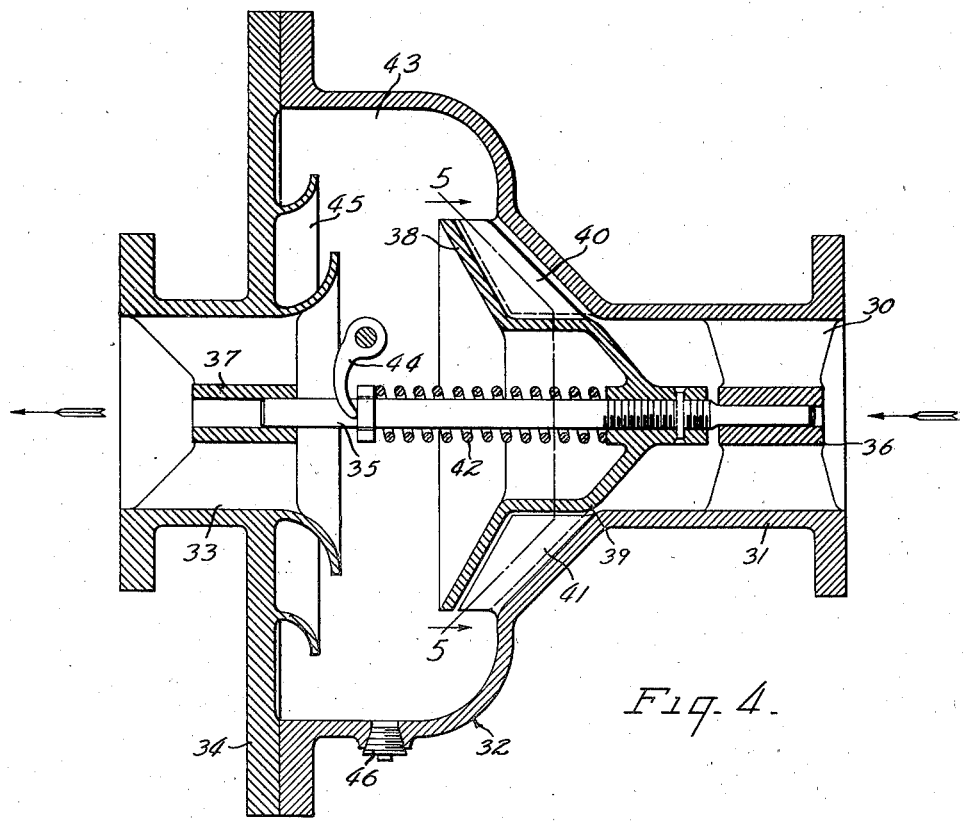
Fig. 4.
Fig. 5.
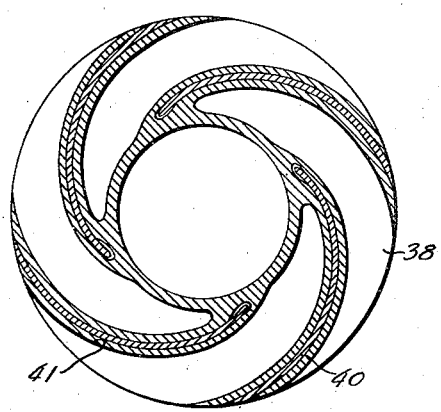
Joseph F. Sebald
INVENTOR
BY
ATTORNEY Patented Sept. 21, 1948

2,449,790

UNITED STATES PATENT OFFICE 2,449,790

SEPARATOR

Joseph F. Sebald, Bloomfield, N. J., assignor to Worthington Pump and Machinery Corporation, Harrison, N. J., a corporation of Delaware Application March 17, 1945, Serial No. 583,192

11 Claims. (Cl. 183—82)

This invention relates to separators, and more particularly to a separator or device employed for the purpose of removing liquid impurities from the vapor or gas in which such impurities are carried in suspension and removed while the vapor or gas is in more or less rapid movement.

More specifically, the present invention relates to what is generally known as a centrifugal type separator in contradistinction to the reverse current, baffle plate or mesh type of separator, and the operating principles of the structure of the present invention is the separation of particles of liquid from gas or vapor by the imparting of centrifugal force to liquid particles and drawing off the gas or vapor in a direction substantially opposite to the direction of flow imparted to the particles by the induced centrifugal action.

In the present invention the mixture flows from the inlet pipe through a nozzle structure, having a plurality of radially extending nozzles, into a chamber where separation of any remaining liquid constituents from the vapor occurs. The drop of pressure in the nozzles produce substantially adiabatic expansion of the gases and the curved flow directing surfaces bounding the nozzles cause a radial-rotary motion of the fluid mixture. Centrifugal force due to the radial motion causes the particles of greater density, i. e., liquid particles, to fly to the walls of the nozzles and the walls of the separating chamber from whence they are drained. With saturated vapor the expansion results in the formation and separation of liquid particles which may later be evaporated by loss of velocity so that the vapor leaving the device is dry.

It is apparent that the efficiency of separation is to a large extent dependent on the magnitude of the centrifugal pressure created in the fluid mixture and this, in turn, is directly related to its centrifugal velocity. If the rate of flow through a separator having nozzles of non-variable cross sectional area decreases, the velocity of the jet must also decrease. At low rates of flow the velocity may be insufficient to produce a centrifugal force on the particles which will separate them from the gas.

It is an object of the present invention to provide a separator of the type described in which the centrifugal pressure, hence the separating action, will be substantially constant for a wide range of flow conditions. This is achieved by providing nozzles with adjustable cross sectional flow areas. Specifically, variations in the pressure of the incoming fluid act on a spring loaded nozzle adjusting disc to vary the cross sectional areas of the nozzles at a rate corresponding to the spring properties and over a pressure range having its low value determined by the initial setting of the spring. At low rates of flow through the device of the present invention, the spring forces the nozzle adjusting disc to reduce the nozzle area sufficiently to obtain at least the minimum velocity required for separation. Increases in the rate of flow result in increases in the nozzle area so that over that range in which the spring forces and fluid forces acting on the disc are in equilibrium, the jet velocity and centrifugal separating action will be substantially constant. The invention also embodies means for adjusting the initial spring load on the disc so as to vary the pressure range over which constant jet velocity occurs and adapt the device to different flow conditions.

Another object is to provide a separator from which initially saturated vapors may be discharged in a relatively dry state. With the flow of saturated vapors adiabatic expansion causes some condensation to take place in the vapor as it passes through the curved vane passages. Such condensation forms liquid particles of microscopic size and because of the turbulent condition following the expansion of the gaseous medium these particles of liquid contact each other and combine thus producing particles of sufficient mass to effect a high degree of separation from the vapor by centrifugal force. The jets leaving the nozzles or curved vane passages are received in a larger chamber wherein the direction of flow is again changed and velocity is lost. Some of the kinetic energy of the vapor is converted to heat with the result that the vapor leaving the separator approaches a dry state.

With these and other objects in view, as may appear from the accompanying specification, the invention consists of various features of construction and combination of parts which will be first described in connection with the accompanying drawings, showing a separator of a preferred form embodying the invention, and the features forming the invention will be specifically pointed out in the claims.

In the drawings:

Figure 4 is a longitudinal section of a modified form of the centrifugal separator.

Figure 5 is a detail section taken on the line 5—5 of Figure 4.

Figure 1:
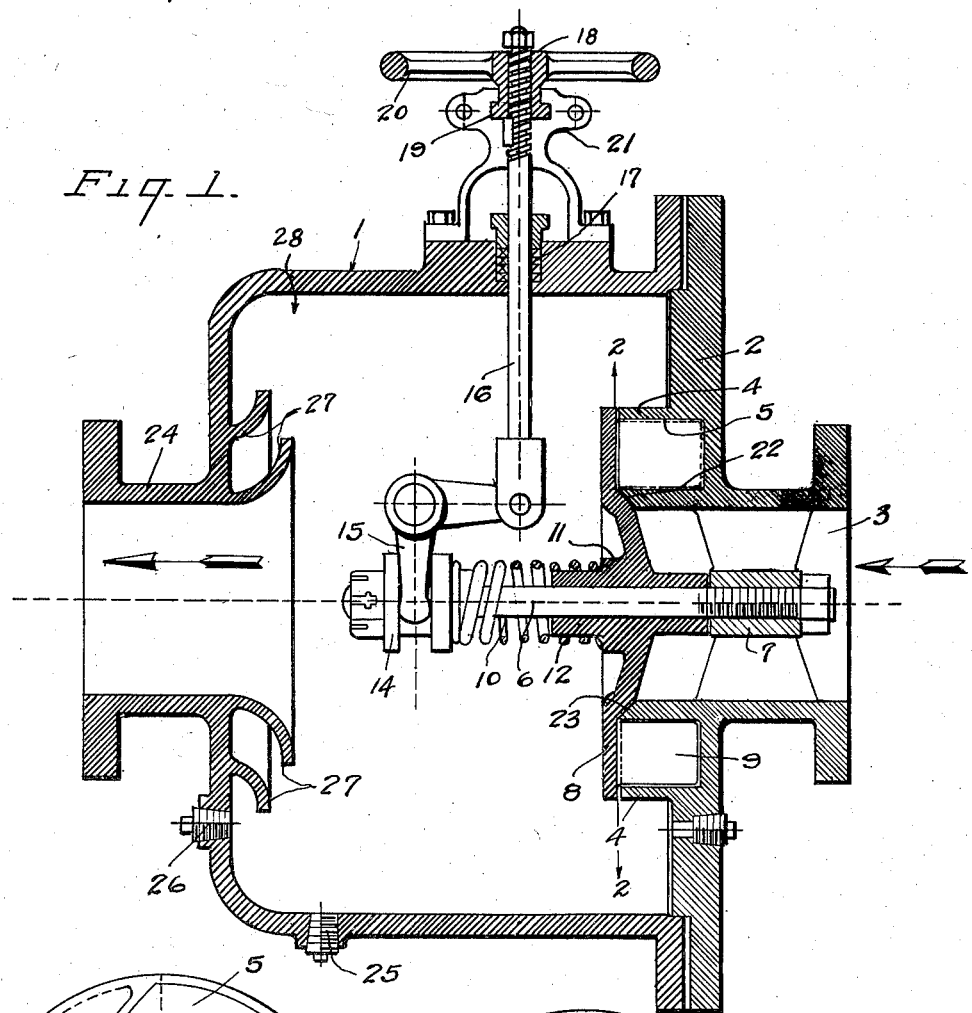
Figure 1 is a longitudinal section through an improved separator of the centrifugal type constructed in accordance with the present invention showing the device in a closed position so that there is no flow through the apparatus.
Figure 3:
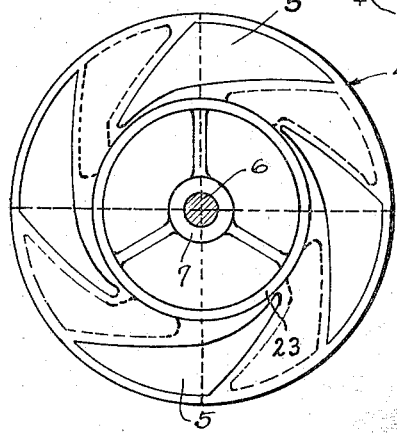
Figure 3 is a view looking to the right along line 2—2 of Figure 1 and shows the recesses as they appear when the vane and disc structure are removed therefrom.
Figure 2:
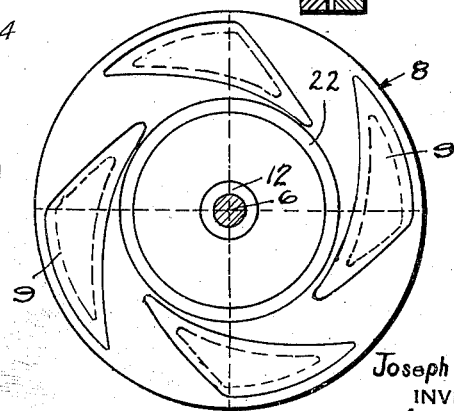
Figure 2 is a view looking to the left along line 2—2 of Figure 1 and shows the vane and disc structure as it appears when moved to the left sufficiently to remove the vanes from their recesses.

Referring more particularly to the drawings and the preferred form of the invention shown in Figures 1 to 3 thereof, the centrifugal separator comprises a housing 1 having a removable end cover 2 attached thereto. The end cover 2 has an inlet 3 therein for the inlet of the vapor or gas and contained impurities. The inner surface of the end cover 2 is enlarged or increased in thickness for a predetermined distance about the inlet 3, and this thickened portion 4 is provided with a series of spiral vane-like recesses 5. A shaft 6 is supported by a suitable bearing 7 formed in the inlet 3. The shaft 6 is non-rotating, being held against rotation in its bearing, and it has a disc 8 slidably mounted thereon. The disc 8 has a plurality of vanes 9 formed on one side thereof or attached thereto which together with the disc form a valve-like structure. The vanes 9 slidably extend into the spiral vane-like recesses or slots 5 formed in the end cover 2 to produce, in effect, a plurality of nozzles or curved flow passages bounded by the sides of the vanes 9, the disc 8, and the surfaces between the recesses 5, which have cross sectional flow areas depending upon the longitudinal position of the disc 8. A spring 10 engages against a suitable shoulder 11 formed on the hub 12 of the disc 8. The end of the spring opposite to that which engages the shoulder 11 engages against a spool 14 which is slidably mounted upon the shaft 6. A bell-crank arm 15 engages the spool 14 for shifting the spool to regulate the tension of the spring 10. Suitable manually operated means are provided for operating the bell crank 15, and this means comprises a vertically adjustable rod 16. The rod 16 extends out of the housing 1 through a suitable packed joint or opening 17 and has its outer end threaded as shown at 18. A nut 19 which has a hand wheel 20 formed thereon is mounted upon the threaded portion 18 of the stem 16 and is held against vertical movement relative to the housing 1 by means of a suitable supporting bracket 21 so that when the hand wheel 20 is rotated the stem 16 will be moved longitudinally for regulating the tension of the spring 10. The disc 8 of the valve-like vane-carrying structure is provided with a seat 22 which engages against a corresponding seat 23 formed on the inner periphery of the wall of the inlet 2 to form a non-return check valve structure, in addition to other functions hereinafter set out.

It is clear from Figure 1 that both the pressure of the fluid within the housing or separation chamber 28 and the pressure of the spring 10 urge the disc 8 to seat itself on the inlet wall seat 22 and cut off fluid flow through the nozzles or curved flow passages. The pressure of the fluid entering the device through the inlet 3 acts counter to those pressures and tends to unseat the disc 8 and withdraw the vanes 9 from their recesses 5. In Figure 1 the disc is fully seated and fluid does not flow through the unit. An increase in the rate of flow will increase the fluid pressure on the disc 8 and force it to the left thus withdrawing the vanes 9 from the recesses 5. The longitudinal position of the disc 8 and thus the cross sectional flow areas of the nozzles is determined by the relative values of the conflicting pressures acting thereon and represents an equilibrium between the pressures as those familiar with check and pressure valves will understand.

These features of construction make it possible to obtain a relatively constant centrifugal velocity as well as to secure efficient separation at low rates of flow. In considering flow through a nozzle, or any other conduit, it is recognized that the area of the nozzle and the velocity of fluid at that particular cross section are inversely proportional—their product being the rate of flow. It follows that if the area of the nozzle be suitably increased as the rate of flow is increased there will be no change in velocity. This condition exists in the present invention wherein increases in the rate of flow increase the pressure on the disc 8 forcing it to enlarge the nozzle areas an amount proportional to the increases in flow. The maximum pressure at which this proportionality occurs depends upon the length of the spring 10 or the distance between the spool 14 and hub 12 when the disc is seated. The minimum pressure, below which there is no flow through the device, depends upon the initial setting or resistance of the spring 10 and may be varied through the parts actuated by the hand-wheel 20. At very low rates of flow pressure build-up in the inlet 3 and inlet line (not shown) will unseat the disc 8 to permit separation to take place.

The liquid particles to be separated from the vapor or gas are separated by the centrifugal action and the change in direction of flow of the gas or vapor as it rotates within the housing and travels towards the center of the outlet pipe 24 of the separator. The liquid particles are thrown by the centrifugal force to the inner surface of the housing 1 on which they collect and run down the sides of the housing by gravity to the bottom thereof from whence they may be discharged through a suitable drain opening 25 when the separator is positioned in a horizontal position as is shown in the drawings, or out through the drain 26 when the separator is placed in a vertical position.

The separated out liquid particles are restrained from reaching the outlet 24 by means of their tendency to adhere to the inner surface of the sides of the housing 1 and by the low velocity of the gas or vapor towards the center of the separator. The velocity of the gas or vapor towards the center of the separator is so controlled by the proportions of the structure that it is sufficiently low to prevent the entrainment of the liquid particles in the vapor or gas as it flows towards the outlet 24.

A series of arcuate liquid collection rings 27 are formed upon or attached to the inner surface of the housing 1 about the inner end of the outlet 24. These collection rings or baffles 27 curve outwardly from the axis of the outlet 24, as clearly shown in Figure 1 of the drawings, and they prevent the separated out liquid particles from flowing directly into the path of the gas or vapor leaving the housing 1 through the outlet 24.

Figures 4 and 5 of the drawings illustrate a modified form of the separator. The operation of this modified form of separator is, however, identical with the operation of the preferred form of the separator as disclosed in Figures 1 to 3, inclusive, and the differences between this modified structure and the preferred structure are merely matters of physical differences. For instance, in the modified structure shown in Figures 4 and 5 of the drawings, the inlet 30 is formed by the cylindrical extension 31 of the housing 32, while the outlet 33 is carried by the removable cover plate 34. A shaft 35 is supported at its opposite ends by a bearing 36 in the inlet 30 and a second bearing 37 in the outlet 33. A dished disc 38 is slidably mounted upon the shaft 36 and it has a valve-forming extension 39 formed thereon which fits into the inlet 30 to form a non-return check valve. A plurality of curved spiral vanes 40 are carried by the disc 38 and they extend slidably into corresponding curved spiral recesses 41 formed in the housing 32 and, consequently, about the inner end of the inlet 30. A spring 42 is provided for imparting a compression load upon the movable valve-like member comprising the disc 38 and vanes 40 so as to provide the predetermined differential pressure between the vapor or gas entering the housing 32 and the separation chamber 43 formed in the housing. The setting of the spring 42 may be regulated by means of a pivotally mounted fork 44. Any suitable means (not shown) may be provided for adjusting the fork 44, for example, manually operated mechanism such as shown in connection with the forked end of the bell crank 15, as shown in Figure 1 of the drawings.

The cover plate 34 has inwardly extending, outwardly curving baffles or collection rings 45 formed thereon outwardly of the inlet end of the outlet 33 so as to prevent the separated out liquid particles from passing through the path of the outgoing vapor from the separation chamber 43. The housing 32 has a suitable drain 46 through which the collected, separated out liquid particles may be drained from the separation chamber.

It will be understood that the invention is not to be limited to the specific construction or arrangement of parts shown, but that they may be widely modified within the invention defined by the claims.

What is claimed is:

1. In a separator of the centrifugal type, a housing having an inlet for gas or vapor, a plurality of arcuate nozzles in said housing forming curved flow passages to impart centrifugal force to the vapor or gas flowing therethrough, said nozzles including vanes adjustably carried by said housing and subject to movement under variations in the quantity flow of vapor into the housing to vary the cross-sectional area of the curved flow passages to produce relatively constant velocity of vapor or gas through the passages through wide variations of flow rate of vapor or gas to the separator, and means for applying a compression load to said vanes to provide a predetermined differential pressure between the vapor or gas entering the housing and the separation space in the interior of the housing.

2. In a separator of the centrifugal type, a housing having an inlet for gas or vapor, a plurality of arcuate nozzles in said housing forming curved flow passages to impart centrifugal force to the vapor or gas flowing therethrough, said nozzles including vanes adjustably carried by said housing and subject to movement under variations in the quantity flow of vapor into the housing to vary the cross-sectional area of the curved flow passages to produce relatively constant velocity of vapor or gas through the passages through wide variations of flow rate of vapor or gas to the separator, means for applying a compression load to said vanes to provide a predetermined differential pressure between the vapor or gas entering the housing and the separation space in the interior of the housing, and adjustable means for adjusting said compression load-applying means to vary the compression load applied in accordance with the particular vapor or gas being passed through the separator.

3. In a separator of the centrifugal type, a housing having an inlet for gas or vapor, a plurality of arcuate nozzles in said housing forming curved flow passages to impart centrifugal force to the vapor or gas flowing therethrough, said nozzles including vanes adjustably carried by said housing and subject to movement under variations in the quantity flow of vapor into the housing to vary the cross-sectional area of the curved flow passages to produce relatively constant velocity of vapor or gas through the passages through wide variations of flow rate of vapor or gas to the separator, said housing having an outlet for vapor or gas, and a plurality of inwardly extending outwardly flaring collection rings in said housing about said outlet opening for preventing separated out liquid particles from passing across the outward flow path of the gas or vapor.

4. In a separator of the centrifugal type, a housing having an inlet for gas or vapor, a plurality of arcuate nozzles in said housing forming curved flow passages to impart centrifugal force to the vapor or gas flowing therethrough, said nozzles including vanes adjustably carried by said housing and subject to movement under variations in the quantity flow of vapor into the housing to vary the cross-sectional area of the curved flow passages to produce relatively constant velocity of vapor or gas through the passages through wide variations of flow rate of vapor or gas to the separator, means for applying a compression load to said vanes to provide a predetermined differential pressure between the vapor or gas entering the housing and the separation space in the interior of the housing, adjustable means for adjusting said compression load-applying means to vary the compression load applied in accordance with the particular vapor or gas being passed through the separator, said housing having an outlet for vapor or gas, and a plurality of inwardly extending outwardly flaring collection rings in said housing about said outlet opening for preventing separated out liquid particles from passing across the outward flow path of the gas or vapor.

5. In a separator of the centrifugal type, a housing having an inlet and an outlet for vapor or gas, a plate slidably carried by said housing, a plurality of curved vanes carried by said plate, said housing provided with a plurality of curved recesses therein surrounding said vapor or gas inlet, said recesses receiving said vanes, said vanes being moved outwardly in said recesses by incoming vapor or gas to provide curved flow passages to impart centrifugal force to the incoming vapor or gas.

6. In a separator of the centrifugal type, a housing having an inlet and an outlet for vapor or gas, a plate slidably carried by said housing, a plurality of curved vanes carried by said plate, said housing provided with a plurality of curved recesses therein surrounding said vapor or gas inlet, said recesses receiving said vanes, said vanes being moved outwardly in said recesses by incoming vapor or gas to provide curved flow passages to impart centrifugal force to the incoming vapor or gas, and means for applying a compression load to said plate to provide a predetermined differential pressure between the incoming vapor or gas and the separation space formed in the interior of the housing inwardly of the outlets of the curved passages formed by said vanes.

7. In a separator of the centrifugal type, a housing having an inlet and an outlet for vapor or gas, a plate slidably carried by said housing, a plurality of curved vanes carried by said plate, said housing provided with a plurality of curved recesses therein surrounding said vapor or gas inlet, said recesses receiving said vanes, said vanes being moved outwardly in said recesses by incoming vapor or gas to provide curved flow passages to impart centrifugal force to the incoming vapor or gas, and means for applying a compression load to said plate to provide a predetermined differential pressure between the incoming vapor or gas and the separation space formed in the interior of the housing inwardly of the outlets of the curved passages formed by said vanes, and adjustable means for adjusting said compression-load-applying means to vary the load applied in accordance with the particular vapor or gas being passed through the separator.

8. A centrifugal separator for separating liquid particles from gases comprising a housing having an inlet for the fluid mixture and outlets for the gases and separated liquid, said housing having a plurality of circumferentially spaced curved recesses extending radially from a position adjacent said inlet, a slidably mounted vane structure registering with said recesses to provide a plurality of curved flow passages having cross sectional flow areas determined by the position of said vane structure, a separation chamber, said flow passages receiving fluid from said inlet and discharging it into said chamber, resilient pressure means, said vane structure being constructed and arranged so that the pressure of the incoming fluid urges it to increase said cross sectional flow areas and the pressure of the fluid within the separation chamber and said pressure means urge it to reduce said areas.

9. A centrifugal separator for separating liquid particles from gases comprising a housing having an inlet for the fluid mixture and outlets for the gases and separated liquid, said housing having a plurality of circumferentially spaced curved recesses extending radially from a position adjacent said inlet, a slidably mounted vane structure registering with said recesses to provide a plurality of curved flow passages having cross sectional flow areas determined by the position of said vane structure, a separation chamber, said flow passages receiving fluid from said inlet and discharging it into said chamber, resilient pressure means, said vane structure being constructed and arranged so that the pressure of the incoming fluid urges it to increase said cross sectional flow areas and the pressure of the fluid within the separation chamber and said pressure means urge it to reduce said areas, and means for varying the initial compression of said pressure means whereby the pressure of the incoming fluid required to initially move said vane structure and increase said flow areas will be varied.

10. A centrifugal separator comprising housing means having an inlet for fluid mixtures and outlets for gases and liquids, said housing means having a plurality of recesses, a plurality of vanes slidably fitting into said recesses to provide a plurality of nozzles having cross sectional flow areas determined by the proximity of the vanes to the bottoms of the recesses, a separation chamber within said housing means, said nozzles being positioned so as to receive fluid from said inlet and discharge it into said separation chamber, and means acted upon by the incoming fluid to slidably move said vanes in said recesses.

11. A centrifugal separator for removing liquid particles from gases comprising a housing having inlet means and outlet means, said housing having a plurality of curved circumferentially spaced recesses extending radially and surrounding the inlet means, a plurality of vanes slidably fitting in said recesses, a disc slidably mounted in said housing and yieldably biased to close said inlet means, said vanes being attached to said disc so that when the disc closes the inlet means the vanes will be fully within said recesses, said disc and said vanes forming with the housing surfaces between said recesses a plurality of curved nozzles extending radially from said inlet means and having cross sectional flow areas determined by the proximity of the disc to said housing surfaces, said housing having a separation chamber, and said nozzles receiving fluid from said inlet means and discharging fluid into said separation chamber.

JOSEPH F. SEBALD.

REFERENCES CITED

The following references are of record in the file of this patent:

UNITED STATES PATENTS

| Number | Name | Date |
| --- | --- | --- |
| 1,255,533 | Heinrich | Feb. 5, 1918 |
| 1,664,683 | Hawley | Apr. 3, 1928 |
| 1,676,511 | Wood | July 10, 1928 |
| 1,853,496 | Blair | Apr. 12, 1932 |
| 1,859,010 | Stratford | May 17, 1932 |
| 1,983,213 | Brady et al. | Dec. 4, 1934 |
| 2,057,667 | Blome | Oct. 20, 1936 |

FOREIGN PATENTS

| Number | Country | Date |
| --- | --- | --- |
| 631,961 | France | Dec. 29, 1927 |